United States Patent [19]

Tamuraya

[11] Patent Number: 4,926,295
[45] Date of Patent: May 15, 1990

[54] SUN VISOR FOR AUTOMOTIVE VEHICLE

[75] Inventor: Makoto Tamuraya, Isehara, Japan

[73] Assignee: Nissan Motor Co., Ltd., Yokohama, Japan

[21] Appl. No.: 413,716

[22] Filed: Sep. 28, 1989

[30] Foreign Application Priority Data

Oct. 17, 1988 [JP] Japan .................. 63-261073

[51] Int. Cl.$^5$ .................................. F21V 33/00
[52] U.S. Cl. ............................ 362/144; 362/83.1; 362/154; 362/802
[58] Field of Search ............ 362/61, 80.1, 83.1, 362/142, 144, 154, 253, 269, 394, 802, 74; 296/97.2, 97.3, 97.5

[56] References Cited

U.S. PATENT DOCUMENTS

| 4,624,499 | 11/1986 | Flowerday | 362/144 X |
| 4,734,831 | 3/1988 | Keyser et al. | 362/74 |
| 4,807,093 | 2/1989 | Cisler | 362/144 X |

FOREIGN PATENT DOCUMENTS 61-117722 7/1986 Japan .

Primary Examiner—Stephen F. Husar
Attorney, Agent, or Firm—Foley & Lardner, Schwartz, Jeffery, Schwaab, Mack, Blumenthal & Evans

[57] ABSTRACT

To maximize the area of a vanity mirror and improve external appearance of a sun visor under consideration of safety, the sun visor comprises an upper sun visor element, a mirror unit whose upper end is supported by the upper sun visor element, and a lower sun visor element slidably fitted to the mirror unit. In out of use of the mirror, the lower sun visor element is vertically slid to its uppermost position into contact with the upper sun visor element to cover the mirror. In use, the lower sun visor element is vertically slid to its lowermost position with a click feeling to expose the mirror. Further, a lamp unit and a lamp switch are housed within the upper sun visor element for illumination. Further, it is preferable to automatically turn on the lamp whenever the mirror is exposed with the lamp switch set to "AUTO" position.

5 Claims, 3 Drawing Sheets

SUN VISOR FOR AUTOMOTIVE VEHICLE

BACKGROUND OF THE INVENTION

1. Field of the Invention

The present invention relates generally to a sun visor for an automotive vehicle, and more specifically to a sun visor provided with a vanity (toilet) mirror.

2. Description of the Prior Art

Various sun visors provided with a vanity mirror for automotive vehicles have been proposed. In particular, Japanese Published Unexamined (Kokai) Utility Model Application No. 61-117722 discloses a sun visor provided with a vanity mirror and a lamp unit, in which the mirror is attached to the back surface of a sun visor body and two lamps are mounted on both the side portions thereof, and further the mirror and the lamp unit are protected by a pivotal mirror cover.

In this prior-art sun visor provided with a vanity mirror, since the lamps are mounted on both the sides of the mirror and therefore the mirror is usable at night under illumination, this sun visor is convenient for the passenger. In this prior-art sun visor, however, since the mirror and the lamp unit are both arranged on a small limited area of the sun visor body, there exists a problem in that the area of the mirror is small. In addition, when the pivotal mirror cover is pivoted open upward to expose the vanity mirror, since the free end of the mirror cover projects toward the face of the passenger, there exists a problem in that when kept open, the pivotal mirror cover is obstructive or dangerous to the passenger. Further, when the pivotal mirror cover is kept closed to use the sun visor as a sunshade, since the shape of the sun visor is relatively large, there exists another problems in that the sun visor appears strange or horribly huge just before the passenger.

SUMMARY OF THE INVENTION

With these problems in mind, therefore, it is the primary object of the present invention to provide a sun visor for an automotive vehicle, in which the vanity mirror area can be maximized for passenger's convenience and the mirror cover will not be obstructive or dangerous to the passenger even when kept open, while improving the external appearance thereof under consideration of safety at collision.

To achieve the above-mentioned object, a sun visor for an automotive vehicle, according to the present invention, comprises (a) an upper sun visor element (20) pivotally supported near a front windshield; (b) a mirror unit (40) whose upper end is supported by said upper sun visor element; and (c) a lower sun visor element (30) slidably fitted to said mirror unit, said mirror unit being covered by said lower sun visor element when said lower sun visor element is slid to its uppermost position into contact with said upper sun visor element, and being exposed between said two upper and lower sun visor elements when said lower sun visor element is slid to its lowermost position away from said upper sun visor element.

It is preferable that the sun visor comprises a lamp unit (50) housed within the upper sun visor element; and a lamp switch (60) mounted on the upper sun visor element and connected to the lamp unit to turn on or off the lamp unit.

Further, the sun visor preferably comprises click switching means (65) for automatically turning on the lamp unit with click feeling when the lower sun visor element is slid to its lowermost position to expose the mirror element, with the lamp switch set to an AUTO position.

In the sun visor for an automotive vehicle according to the present invention, when the mirror is not used, the mirror is covered within the lower sun visor element. When the mirror is used, the sun visor is pivoted from an upper unusable position (the sun visor is placed parallel to the vehicle roof) to a lower usable position (the sun visor is placed parallel to the front windshield) and then the lower sun visor element is slid downward to expose the mirror. At night, the lamp switch is turned on for illumination.

Further, when the lamp switch is set to an AUTO position, the lamp unit automatically comes on whenever the lower sun visor element is slid to its lowermost position to expose the mirror for use.

DETAILED DESCRIPTION OF THE PREFERRED EMBODIMENT

Figure 1:
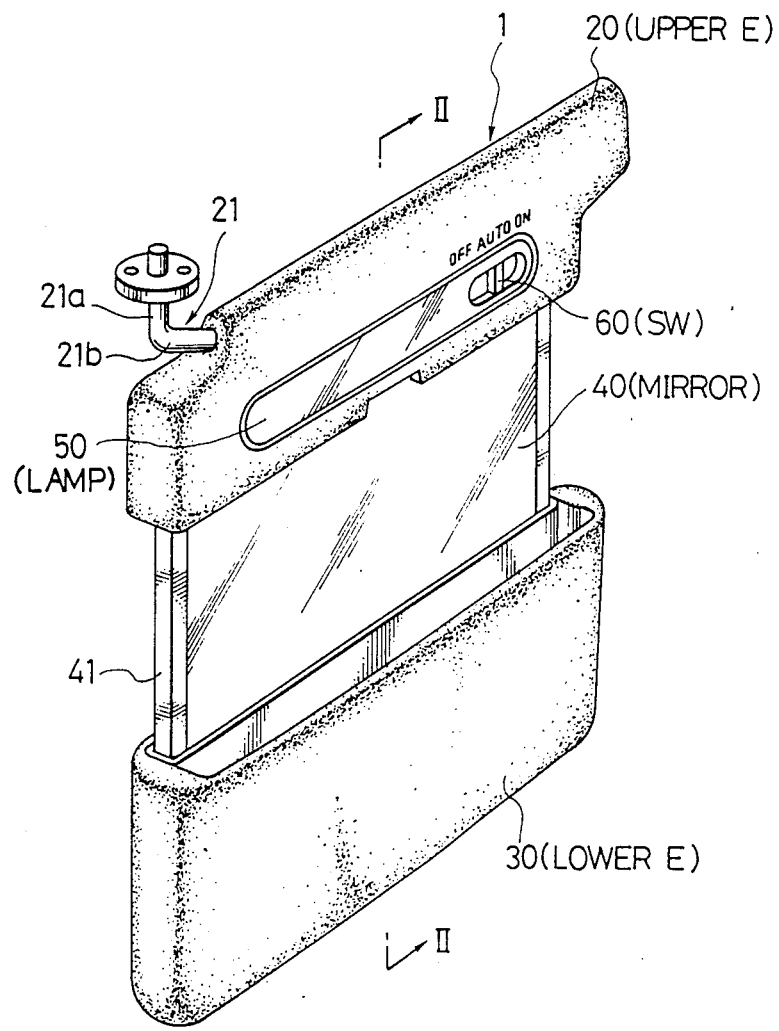
FIG. 1 is a perspective view showing an embodiment of the sun visor for an automotive vehicle according to the present invention.
Figure 2:
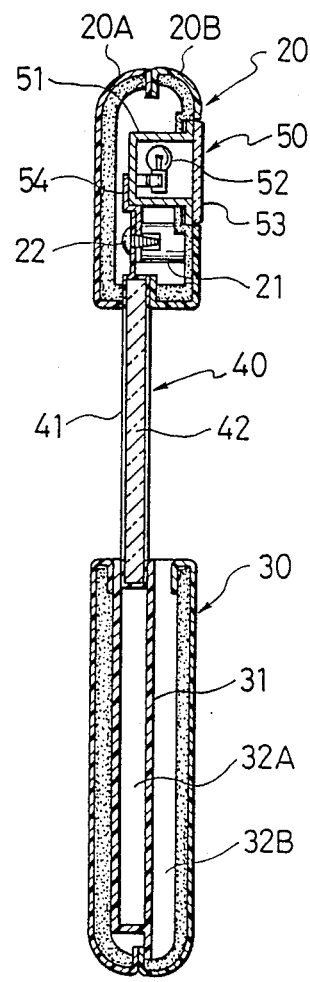
FIG. 2 is a cross-sectional view taken along the line II—II in FIG. 1.

An embodiment of the present invention will be described hereinbelow with reference to the attached drawings. In FIG. 1, a sun visor 1 of the present invention roughly comprises an upper sun visor element 20, a lower sun visor element 30, a vanity mirror unit 40, a lamp unit 50, and a lamp switch 60.

The upper sun visor element 20 is supported by an angled shaft 21 so as to be pivotable in two different directions. That is, when pivoted about a vertical axle 21a of the angled shaft 21, the sun visor 1 is moved from a front position with the sun visor surface placed parallel to a front windshield to a side position with the sun visor surface placed parallel to a side windshield or vice versa; when pivoted about a horizontal axle 21b of the angled shaft 21, the sun visor 1 is moved from an upper unusable position with the sun visor surface placed parallel to the vehicle roof to a lower usable position with the sun visor surface placed parallel to the front windshield or vise versa. The mirror unit 40 is supported by the upper sun visor element 20, and the lower sun visor element 30 is slidably fitted to the mirror unit 40. The lamp unit 50 (e.g. fluorescent lamp) is housed within the upper sun visor element 20. The lamp switch 60 is mounted on the upper sun visor element 20 and beside the lamp unit 50 so as to be set to three different positions of "ON", "AUTO" and "OFF".

The upper sun visor element 20 is composed of a front half element 20A, a rear half element 20B and a formed resin 20c. The two half elements 20A and 20B both made of resin are fixed to each other, after the foamed resin 20c has been stuck to the inner surfaces of these two half elements 20A and 20B.

The lamp unit 50 comprises a lamp housing 51, a bulb or tube 52, and a lamp lens 53.

Figure 3:
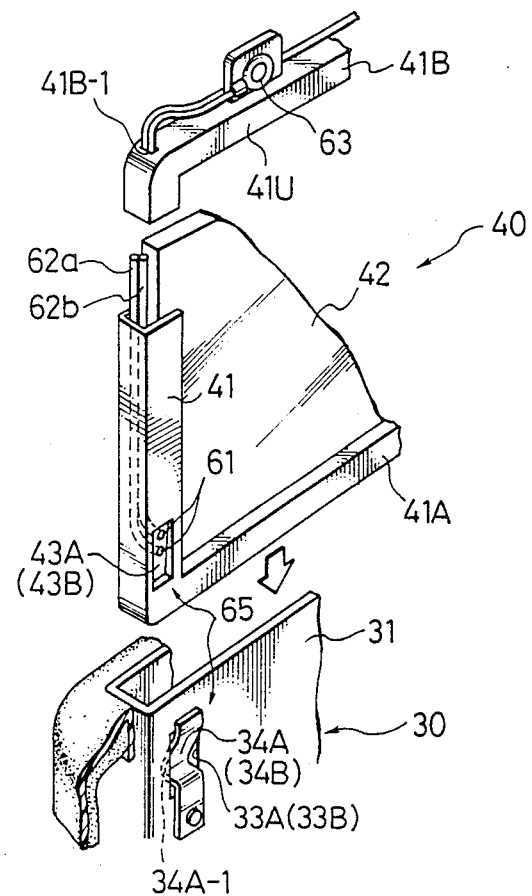
FIG. 3 is a partial perspective view for assistance in side portion of the mirror unit and on the upper side portion of the lower sun visor element.

The mirror unit 40 comprises a resin mirror holder 41 and a mirror body 42 supported by the mirror holder 41. The mirror holder 41 is fixed to a boss portion 21 formed within the upper sun visor element 20 with screws 22. As shown in FIG. 3, the mirror holder 41 is composed of a large lower U-shaped member 41A and a small upper U-shaped member 41B both fixed to each other with the mirror body 42 sandwiched therebetween.

The lower sun visor element is partitioned by an inner plate 31 so as to form two hollow portions 32A and 32B. The front hollow portion 32A is vertically and slidably fitted to the mirror body 42, and the rear hollow portion 32B is used as a glove compartment for putting small articles. Therefore, when the lower sun visor element 30 is slid upward along the mirror unit 40, with the resin mirror holder 41 put into the front hollow portion 32A, into contact with the upper sun visor element 20, the mirror unit 40 is covered into out of use and the sun visor 1 is used as a sunshade or pivoted upward to an unused position. On the other hand, when the lower sun visor element 30 is slid downward along the mirror unit 40, with the resin mirror holder 41 put out of the front hollow portion 32A, the mirror unit 40 is exposed into use as a vanity mirror.

Further, the upper and lower sun visor elements 20 and 30 are both made of a resin material and further an appropriate elastic material (e.g. foamed plastics) is stuck onto the inside surfaces of these elements for safety in case of collision.

To slide the lower sun visor element 30 from a mirror-unusable position to a mirror-usable position in click operation and to automatically turn on the lamp unit 50 at the mirror-usable position, two click switch mechanisms 65 are provided on the mirror unit 40 and the lower sun visor element 30. In more detail, with reference to FIG. 3, two sloped recessed portions 43A (left side) and 43B (right side, not shown) are formed on the lower side portions of the mirror holder 41. Two point contacts 61 are disposed within each sloped recessed portion 43A. Two wires 62a and 62b are passed through a space formed between the mirror body 42 and the mirror holder 41. One end of each of these two wires 62a and 62b is connected to each of the contacts 61. The other end of the wire 62a is connected to one terminal of the switch 60 and the other end of the wire 62b is connected to an eyelet terminal 63. When the mirror holder 41 is fixed to the boss portion 21 with screws 22, the eyelet terminal 63 is simultaneously connected to the lamp unit terminal 54 with the same screws 22.

Further, in FIG. 3, after the mirror body 42 has been set to the lower mirror holder 41A and the two wires 62a and 62b are passed through the space between the mirror body 42 and the lower mirror holder 41A, the upper mirror holder 41B is fitted to the mirror body 42 from above after the wires have been passed through holes 41B-1 formed in the mirror holder 41B. The upper and lower mirror holders 41A and 41B are fixed by an appropriate method (e.g. bonding, welding, etc.)

Further, two square openings 33A (33B) are formed on both the upper side portions of the lower sun visor element 30. A bent leaf spring contact stopper 34A (34B) is fixed by caulking in such a way that a convex portion 34A-1 of this contact stopper 34A projects out of the square opening 33A into contact with the mirror holder 41. Therefore, when the lower sun visor element 30 is slid to its lowermost position, since the contact stopper 34A is dropped into the sloped recessed portion 43A, the two point contacts 61 are connected to each other. Therefore, when the lamp switch 60 is set to "AUTO" position and further the lower sun visor element 30 is slid to its lowermost position, since the two click switch mechanisms 65 are actuated closed to connect the two wires 62a and 62b, the lamp unit 50 is automatically turned on.

In the sun visor of the present invention thus constructed, when the vanity mirror 40 is required to use, the sun visor 1 is pivoted from the position where the sun visor 1 is placed along the vehicle compartment roof to the position where the sun visor 1 is placed along the front windshield and then the lower sun visor element 30 is slid to its lowermost position to expose the mirror 10. In the daytime, since the lamp unit switch 60 is usually set to "OFF" position, the lamp 50 is not turned on.

At night, however, when the lamp unit switch 60 is set to "ON" position, the lamp 50 can be turned on irrespective of the slide position of the lower sun visor element 30. Further, when the lamp unit switch 60 is set to "AUTO" position at night, whenever the lower sun visor element 30 is slid to its lowermost position, since the two click switch mechanisms 65 are actuated closed to connect the two point contacts 61, the lamp 50 is automatically turned on.

In the sun visor of the present invention, since the mirror 40 can be covered by the lower sun visor element 30 and exposed where necessary, it is possible to determine the area of the mirror as broad as possible. On the other hand, since the lamp unit 50 can be housed within the upper sun visor element 20, it is possible to determine the area of the light emission as broad as possible, thus improving the usability of the vanity mirror. Further, since the lower sun visor element 30 is used in common as a mirror cover, and the mirror 40 can be exposed by simply sliding the lower sun visor element 30 away from the upper sun visor element 20, it is possible to improve the safety and the external appearance of the sun visor provided with a vanity mirror, without projecting the mirror cover toward the passenger as is conventional.

In the above embodiment, although the lamp unit 50 is disposed on the rear surface of the upper sun visor element 20, it is also possible to construct the upper sun visor unit 20 as a lamp unit. In this case, the front surface (on the windshield side) of the lamp unit is formed by an appropriate opaque material to prevent the light generated from the lamp unit from being emitted toward the frontward direction.

What is claimed is:

1. A sun visor for an automotive vehicle comprising:
    (a) an upper sun visor element pivotally supported near a front windshield;
    (b) a mirror unit whose upper end is supported by said upper sun visor element; and
    (c) a lower sun visor element slidably fitted to said mirror unit, said mirror unit being covered by said lower sun visor element when said lower sun visor element is slid to its uppermost position into contact with said upper sun visor element, and being exposed between said two upper and lower sun visor elements when said lower sun visor element is slid to its lowermost position away from said upper sun visor element.

2. The sun visor for an automotive vehicle of claim 1, which further comprises:
    (a) a lamp unit housed within said upper sun visor element, and (b) a lamp switch mounted on said upper sun visor element and connected to said lamp unit to turn on or off said lamp unit.

3. The sun visor for an automotive vehicle of claim 2, which further comprises click switching means for automatically turning on said lamp unit with click feeling when said lower sun visor element is slid to its lowermost position to expose said mirror element with said lamp switch set to an AUTO position.

4. The sun visor for an automotive vehicle of claim 3, wherein said click switching means comprises:

(a) two point contacts arranged within each of two sloped recessed formed at both the lower side portions of said mirror unit; and
(b) a leaf spring contact stopper disposed in each of two openings formed at both the upper side portions of said lower sun visor element so as to be engageable with said stopped recess for connection of two point contacts.

5. The sun visor for an automotive vehicle of claim 1, wherein said lower sun visor element comprises a glove compartment for putting small articles.

* * * * *